United States Patent
Summerlin et al.

(10) Patent No.: US 11,568,053 B2
(45) Date of Patent: Jan. 31, 2023

(54) AUTOMATED MALWARE MONITORING AND DATA EXTRACTION

(71) Applicant: INTEL 471 INC., Lewes, DE (US)

(72) Inventors: Nick Summerlin, Amsterdam (NL); Ferran Pichel, Barcelona (ES)

(73) Assignee: INTEL 471 INC.

( * ) Notice: Subject to any disclaimer, the term of this patent is extended or adjusted under 35 U.S.C. 154(b) by 25 days.

(21) Appl. No.: 16/956,076

(22) PCT Filed: May 22, 2020

(86) PCT No.: PCT/US2020/034280
§ 371 (c)(1),
(2) Date: Jun. 19, 2020

(87) PCT Pub. No.: WO2021/177989
PCT Pub. Date: Sep. 10, 2021

(65) Prior Publication Data
US 2021/0365556 A1 Nov. 25, 2021

Related U.S. Application Data

(60) Provisional application No. 62/984,140, filed on Mar. 2, 2020.

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| G06F 21/56 | (2013.01) |
| G06F 21/53 | (2013.01) |

(52) U.S. Cl.
CPC ............ *G06F 21/566* (2013.01); *G06F 21/53* (2013.01); *G06F 21/564* (2013.01); *G06F 21/568* (2013.01)

(58) Field of Classification Search
CPC ...... G06F 21/566; G06F 21/53; G06F 21/564; G06F 21/50–568
See application file for complete search history.

(56) References Cited

U.S. PATENT DOCUMENTS

| | | | |
|---|---|---|---|
| 10,176,325 B1* | 1/2019 | Hou | G06F 21/566 |
| 11,038,906 B1* | 6/2021 | Bingham | H04L 43/06 |
| 2012/0079596 A1* | 3/2012 | Thomas | G06F 21/566 |
| | | | 726/24 |
| 2015/0074810 A1* | 3/2015 | Saher | H04L 63/1491 |
| | | | 726/23 |
| 2018/0012021 A1* | 1/2018 | Volkov | G06F 21/53 |

OTHER PUBLICATIONS

PCT/US2020/034280, Automated Malware Monitoring and Data Extraction, May 22, 2020.

\* cited by examiner

*Primary Examiner* — Trong H Nguyen
(74) *Attorney, Agent, or Firm* — Perry + Currier

(57) ABSTRACT

A malware monitoring method includes: obtaining a malware sample; extracting operational parameters corresponding to the malware sample; configuring an emulator application corresponding to the malware sample using the operational parameters; executing a plurality of instances of the configured emulator application; collecting output data from each of the plurality of instances; and generating indicators of compromise (IOCs) based on the collected output data.

18 Claims, 7 Drawing Sheets

AUTOMATED MALWARE MONITORING AND DATA EXTRACTION

CROSS-REFERENCE TO RELATED APPLICATION

This application claims priority from U.S. provisional patent application No. 62/984,140, filed Mar. 2, 2020, the contents of which is incorporated herein by reference.

FIELD

The specification relates generally to computing security systems, and specifically to a system and method for automated malware monitoring and data extraction.

BACKGROUND

Malware detection relies on the detection of indicators of compromise (IOCs), such as traffic patterns, data and the like that indicate the possible presence of malware at a monitored device. Techniques for discovering IOCs for use in malware detection applications include deploying a sandbox environment in which a malware sample is executed and classified, and in which IOCs are derived from the execution of the sample. However, such techniques may provide only limited views of malware activity that are computationally costly and labor-intensive to scale.

SUMMARY

An aspect of the specification provides a malware monitoring method, comprising: obtaining a malware sample; extracting operational parameters corresponding to the malware sample; configuring an emulator application corresponding to the malware sample using the operational parameters; executing a plurality of instances of the configured emulator application; collecting output data from each of the plurality of instances; and generating indicators of compromise (IOCs) based on the collected output data.

Another aspect of the specification provides a computing device comprising: a communications interface; a memory; and a processor configured to: obtain a malware sample; extract operational parameters corresponding to the malware sample; configure an emulator application corresponding to the malware sample using the operational parameters; execute a plurality of instances of the configured emulator application; collect output data from each of the plurality of instances; and generate indicators of compromise (IOCs) based on the collected output data.

BRIEF DESCRIPTIONS OF THE DRAWINGS

Embodiments are described with reference to the following figures, in which.

DETAILED DESCRIPTION

Figure 1:
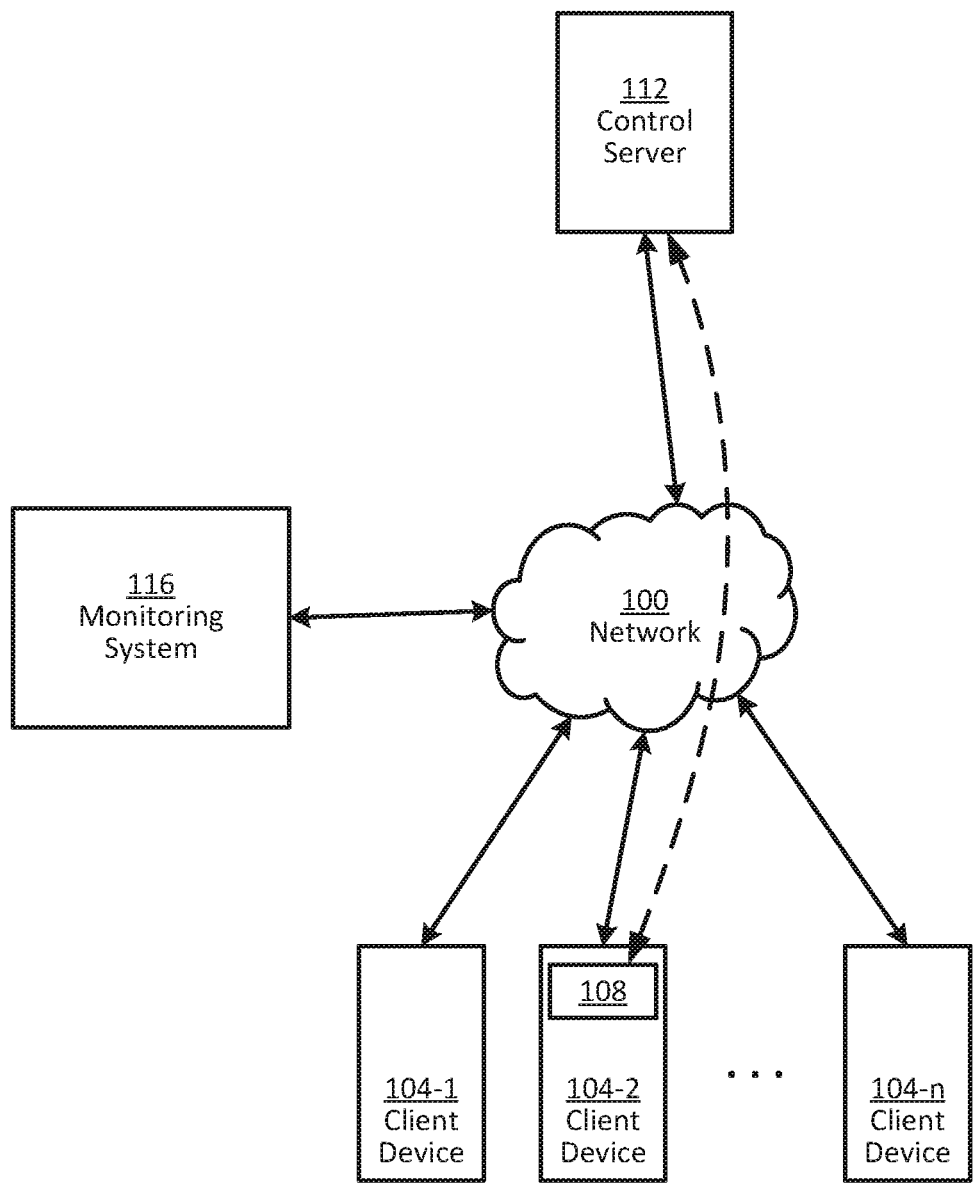
FIG. 1 depicts a communications system including a malware control server, at least one infected client device, and a malware monitoring system.

FIG. 1 depicts a network 100 to which a plurality of computing device 104-1, 104-2, 104-n are connected. The nature of both the network 100 and the computing devices 104 (also referred to as client devices 104) are not particularly limited. For example, the network 100 can include any one of, or any suitable combination of, local and wide-area networks, including the Internet. The client devices 104 can be personal computers (e.g. desktop computers, laptop computers or the like), mobile devices such as smart phones, or servers (e.g. web servers and the like). The client devices 104 may, in other words, implement any of a wide variety of functions.

As illustrated, the client device 104-2 executes an application 108. The application 108 is a malware application configured to disrupt the operations of the client device 104-2 and/or other associated devices, gain unauthorized access to the client device 104-2 and/or other associated devices, or the like. The origin of the malware application 108 at the client device 104-2 is not relevant to the discussion herein. As will be apparent to those skilled in the art, other client devices 104 may also be infected with the application 108, or with other malware applications (whether of the same type, or family, as the application 108, or of different types). A client device 104 infected malware, such as the client device 104-2, may also be referred to as a bot, and the set of client devices 104 infected with a given malware application may be referred to as a botnet.

FIG. 1 also illustrates a control server 112 connected to the network 100. The control server 112, which may also be referred to as a command and control (C&C) server, or simply as the server 112, issues commands to the malware application 108 at the client device 104-2, and any other instances of the malware application 108 present on other client devices 104. Such commands can include instructions to retrieve files from the server 112 itself or other sources, instructions to record sensitive data at the client device 104-2 for transmission to the server 112, or the like. In other words, the server 112 is configured to control the operation of the malware application 108 at any members of the botnet infected by the application 108. As will be apparent to those skilled in the art, a wide variety of botnets may exist, each controlled by one or more control servers and infecting respective sets of client devices 104.

Malware detection applications (e.g. antivirus applications and the like) may be installed on client devices 104 or associated devices to detect malware such as the application 108, either to prevent infection by malware or detect and remove malware after infection. To detect malware, such detection applications may be configured to analyze data and activity at the client device 104, such as the contents of files stored at the client device, network traffic between the client device 104 and the network 100, and the like. The data and activity may be analyzed to detect indicators of compromise (IOCs). IOCs can be strings of code or other text, files or fragments of files, network traffic patterns (as well as addresses or other attributes contained therein) that are known to be associated with malware. In order to detect IOCs, malware detection applications are provided with IOCs previously determined to be likely indicators of malware infection.

The process of identifying IOCs that can be deployed to malware detection applications for use in protecting client devices may involve obtaining samples of malware applications such as the application 108 and executing such samples, e.g. in a sandbox environment such as a virtual machine. The output generated at the virtual machine via execution of the malware sample can be processed to detect portions of that output likely to indicate the presence of the malware. Those portions may be distinguished, for example, from benign activity performed by the malware to obfuscate its presence. IOCs may be generated and deployed to detection applications based on the above-mentioned portions.

The above approach to generating IOCs, however, is computationally costly due to the use of a virtual machine to execute each malware sample under observation. The cost of deploying virtual machines is sufficient to render long-term deployment of a virtual machine to monitor the activity of a malware sample over time impractical. The above-mentioned cost therefore also renders the execution of significant numbers of malware samples impractically costly. Still further, certain malware samples may include evasive capabilities that seek to detect the presence of a sandbox environment and in response, suppress core malware functionality to avoid detection or monitoring. Executing malware samples in multiple sandbox environments may overcome the above difficulty, but such an approach is also rendered difficult by the computational cost of running virtual machines. Still further, employing multiple sandbox environments may require the implementation of malware classification and detection logic specific to each sandbox environment, for a given type of malware, further increasing the cost of monitoring the malware.

Also shown in FIG. 1 is a malware monitoring system 116 connected to the network 100. As will be discussed in detail herein, the system 116 enables a plurality of malware applications such as the application 108 to be monitored at scale and over significant periods of time (e.g. beyond a one-time detonation of a malware sample in a sandbox), while mitigating the costs of the approach set out above. For example, as will be seen in the discussion below, the system 116 enables at least partially automated collection of malware samples, as well as scalable and at least partially automated control of malware emulator execution that reduces or eliminates the need for computationally demanding sandbox environments. In addition, the system 116 enables at least partial automation of the configuration of such emulators, to allow the emulators to communicate with control servers such as the server 112 shown in FIG. 1.

Figure 2:
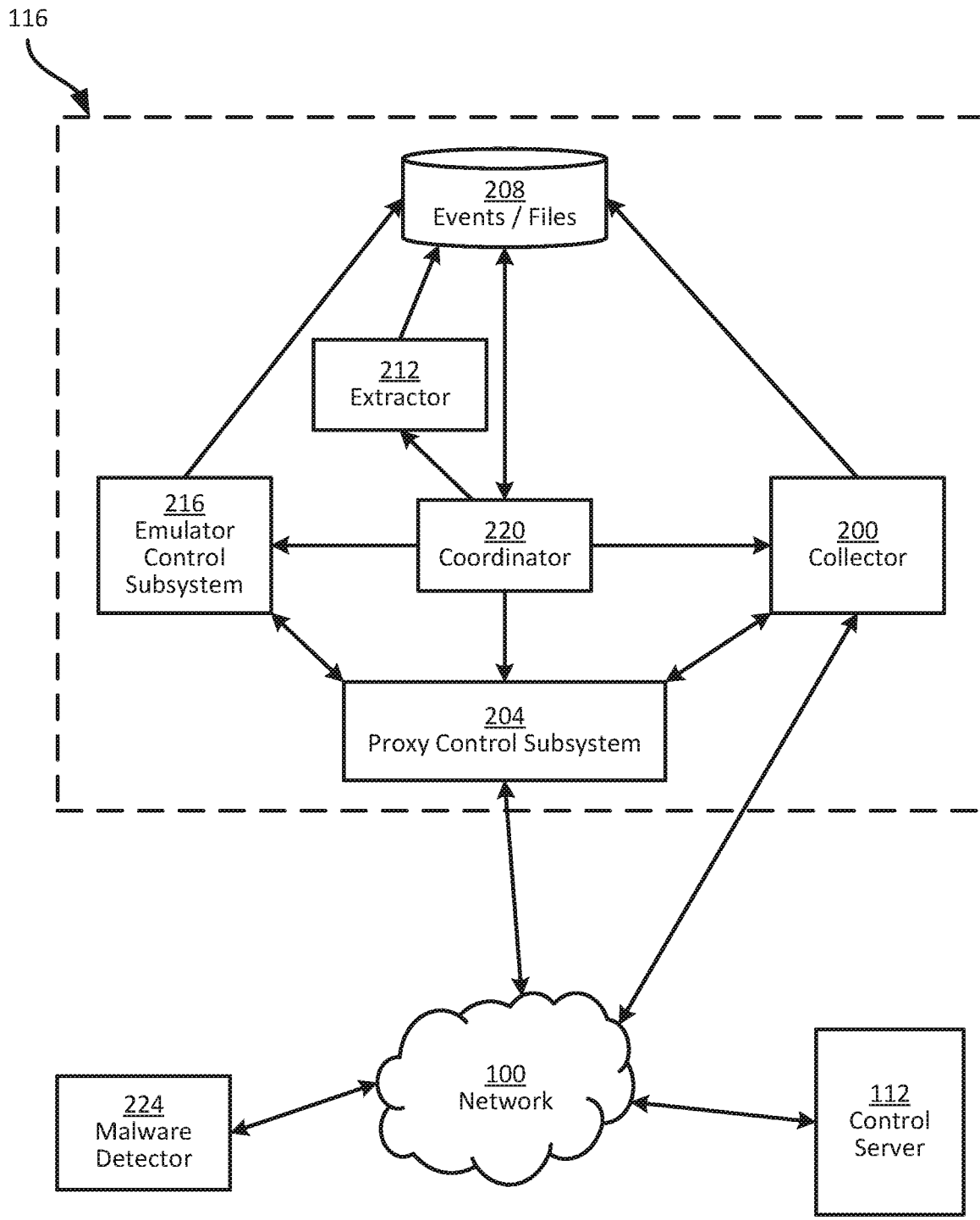
FIG. 2 depicts example components of the malware monitoring system of FIG. 1.

Turning to FIG. 2, example components of the system 116 are shown. The components of the system 116 can be implemented in a single computing device, or using a plurality of computing devices interconnected via the network 100, distinct local networks, or a combination thereof.

The system 116 includes a collector 200 configured to obtain samples of malware applications from various preconfigured sources. Samples may be obtained by the collector 200 directly via the network 100 for some of the above-mentioned sources. The system 116 also includes a proxy control subsystem 204 configured to route communications from the collector 200 and other components of the system 116 through one or more proxy servers, virtual private networks, or the like. The collector 200 may obtain samples from certain sources through the proxy control subsystem 204 rather than directly through the network 100.

The system 116 also includes a repository 208 configured to receive data (e.g. files, memory dumps, status reports from other system components, and the like) and events from each of the other components of the system 116. The repository 208 can be implemented as multiple distinct repositories in other examples, such as a first repository for events and a second repository for files and other data associated with such events. The collector 200, in response to obtaining malware samples from the above-mentioned sources, stores the samples in the repository 208 for subsequent processing by other components of the system 116.

Subsequent processing of malware samples obtained by the collector 200 includes extraction of data from the malware samples, and execution of emulator instances that mimic certain behavior of the malware samples to monitor the activity of the corresponding control server (e.g. the server 112). To that end, the system 116 includes an extractor 212 that is configured to obtain samples of malware stored in the repository 208 (e.g. having been provided to the repository 208 by the collector 200) and execute each sample in at least one sandbox environment (e.g. a virtual machine). The extractor 212 is further configured to collect and analyze output generated via the execution of the sample, to automatically determine certain operational parameters of the malware sample. Those operational parameters, such as a network address of the control server 112, are stored in the repository 208 for use by an emulator control subsystem 216.

The emulator control subsystem 216 is configured to coordinate the execution of a scalable set of malware emulators configured according to the operational parameters determined by the extractor 212. Execution of the malware emulators may also depend on additional data obtained via reverse engineering of malware samples performed outside the system 116 and stored in the repository 208 or provided directly to the emulator control subsystem 216. The emulators can be executed to contact the control server 112 (or other control servers) and obtain commands, data and the like therefrom. Any material received by the emulators from control servers is stored in the repository 208, for subsequent processing and publication as IOCs.

The system 116 also includes, in the illustrated example, a coordinator 220 connected with the repository 208 and each other component of the system 116. The coordinator 220 is configured to monitor the events and data in the repository 208, and to issue commands to the other components of the system 116 based on updates to the repository 208. For example, the coordinator 220 can detect the addition of a new malware sample to the repository 208 by the collector 200. In response, the coordinator 220 can transmit a command to the extractor 212 to execute the malware sample and extract operational parameters therefrom. The command can include the sample, or an instruction for the extractor 212 to retrieve the sample from the repository 208.

The coordinator 220 is also configured to retrieve emulator output from the repository 208 (such output having been stored in the repository 208 by the emulator control subsystem 216), and publish IOCs based on the output, for example for provision to a third party malware detector 224 via the network 100. For example, the coordinator 220 can perform the above functions via execution of an extensible set of agents each configured to monitor the repository 208 for certain types of events, and each configured to take various actions in response to detection of an event. For instance, a publication agent of the coordinator 220 can be configured to monitor the repository 208 for emulator output and derive IOCs therefrom, format the IOCs for transmission and/or transmit the IOCs to the malware detector 224. A sample processing agent of the coordinator 220, meanwhile, can monitor the repository 208 for events indicating the receipt of a new malware sample (e.g. from the collector 200), and instruct the extractor 212 to retrieve and execute such samples to extract operational parameters therefrom.

Figure 3:
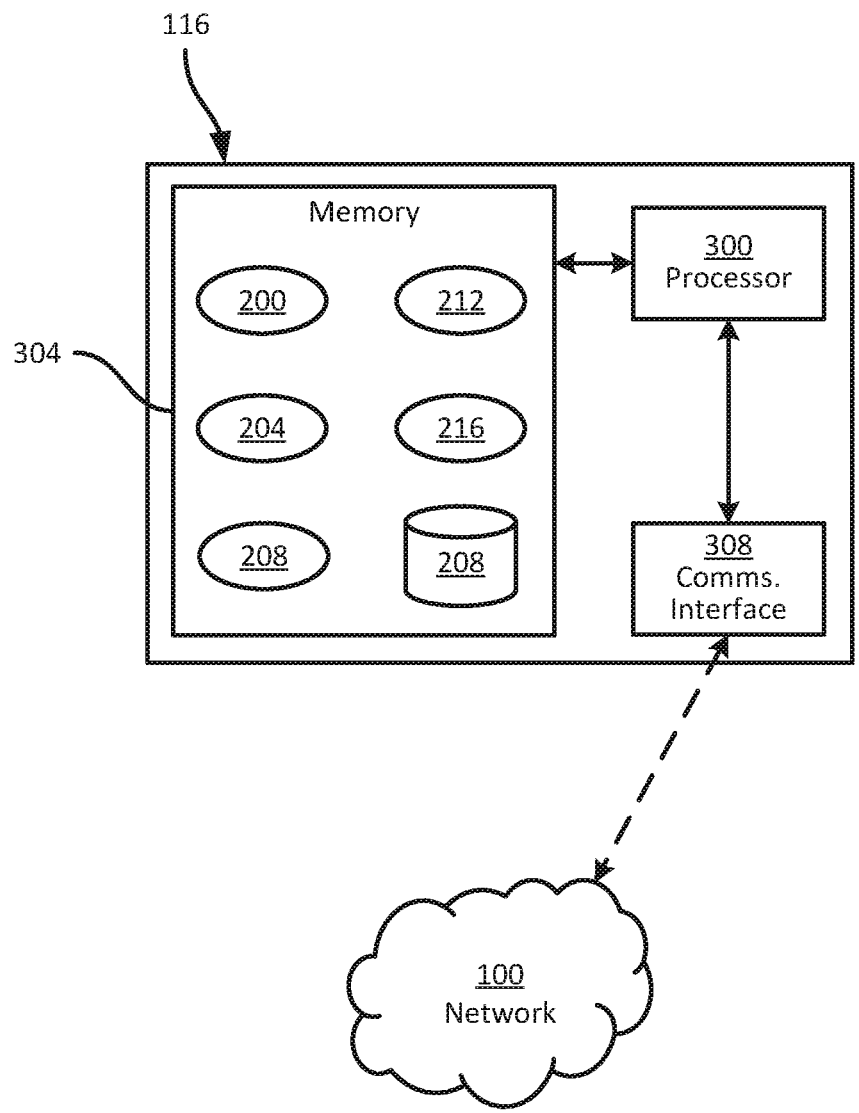
FIG. 3 depicts certain internal components of a computing device implementing the malware monitoring system of FIG. 2.

Turning to FIG. 3, an example implementation of the system 116 is illustrated, in the form of a computing device such as a server. The computing device includes at least one processor 300 (e.g. one or more central processing units, (CPUs)), interconnected with a non-transitory computer readable storage medium, such as a memory 304. The memory 304 includes any suitable combination of volatile memory (e.g. Random Access Memory or RAM) and non-volatile memory (e.g. read only memory or ROM, Electrically Erasable Programmable Read Only Memory or EEPROM, flash memory). The processor 300 and the memory 304 each comprise one or more integrated circuits. The computing device implementing the system 116 also includes a communications interface 308 enabling the computing device to exchange data with other devices such as the control server 112 and the malware detector 224, e.g. via the network 100.

The memory 304 stores computer readable instructions for execution by the processor 300, in the form of a plurality of applications. In particular, the memory 304 stores applications 200, 204, 208, 212 and 216 corresponding to the system components shown in FIG. 2 and discussed above. Execution of the applications by the processor 300 configures the processor 300 to perform various actions. The applications themselves (i.e. the components shown in FIG. 2 and introduced above) may therefore be referred to as performing those actions.

The memory 304 also stores the repository 208 mentioned above. It will be apparent to those skilled in the art that the functionality implemented via the execution of the applications illustrated in FIG. 3 can also be distributed across multiple computing devices. For example, the system 116 can be implemented by a plurality of computing devices rather than the one device shown in FIG. 3. Each of the computing devices implementing the system 116 can execute a subset of the applications 200, 204, 208, 212 and 216.

Figure 4:
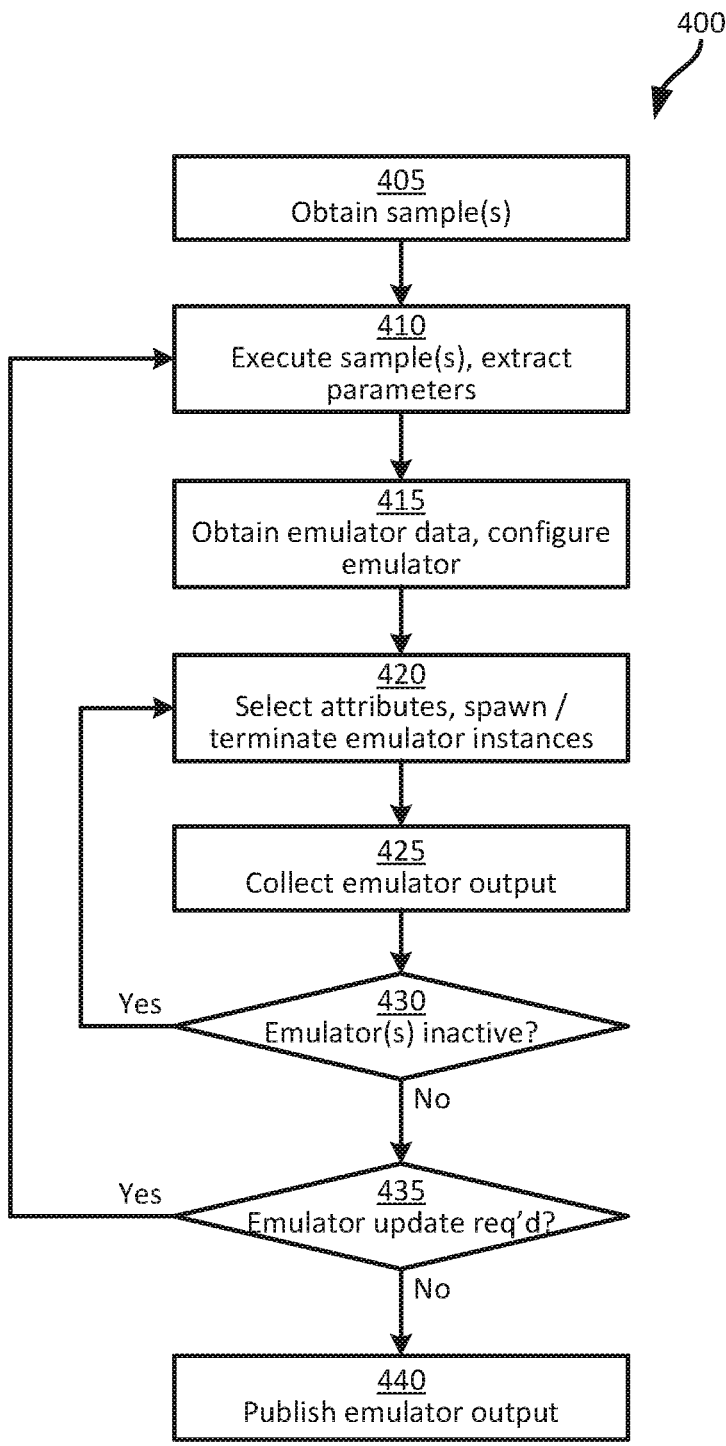
FIG. 4 is a flowchart of a method of monitoring and extracting data from a malware application.

Turning now to FIG. 4, the functionality implemented by the system 116 will be discussed in greater detail. FIG. 4 illustrates a method 400 of malware monitoring and data extraction, which will be discussed below in conjunction with its performance by the system 116 (e.g. as implemented in a computing device shown in FIG. 3).

At block 405, the system 116 is configured to obtain a malware sample. Specifically, the collector 200 is configured to retrieve the sample and store the sample in the repository 208. The collector 200 can maintain a set of source identifiers (e.g. network addresses or the like) corresponding to sources of malware samples. At block 405, therefore, the collector 200 can be configured to send requests to such sources. The requests can be sent periodically, or in response to operator input at the collector 200. The collector 200 can also store, in association with each source identifier, an indicator of whether the corresponding source is a trusted source or an untrusted source. Trusted sources may include computing devices, repositories and the like operated by security research entities and the like. Untrusted sources, meanwhile, can include malware marketplaces and the like.

Figure 5:
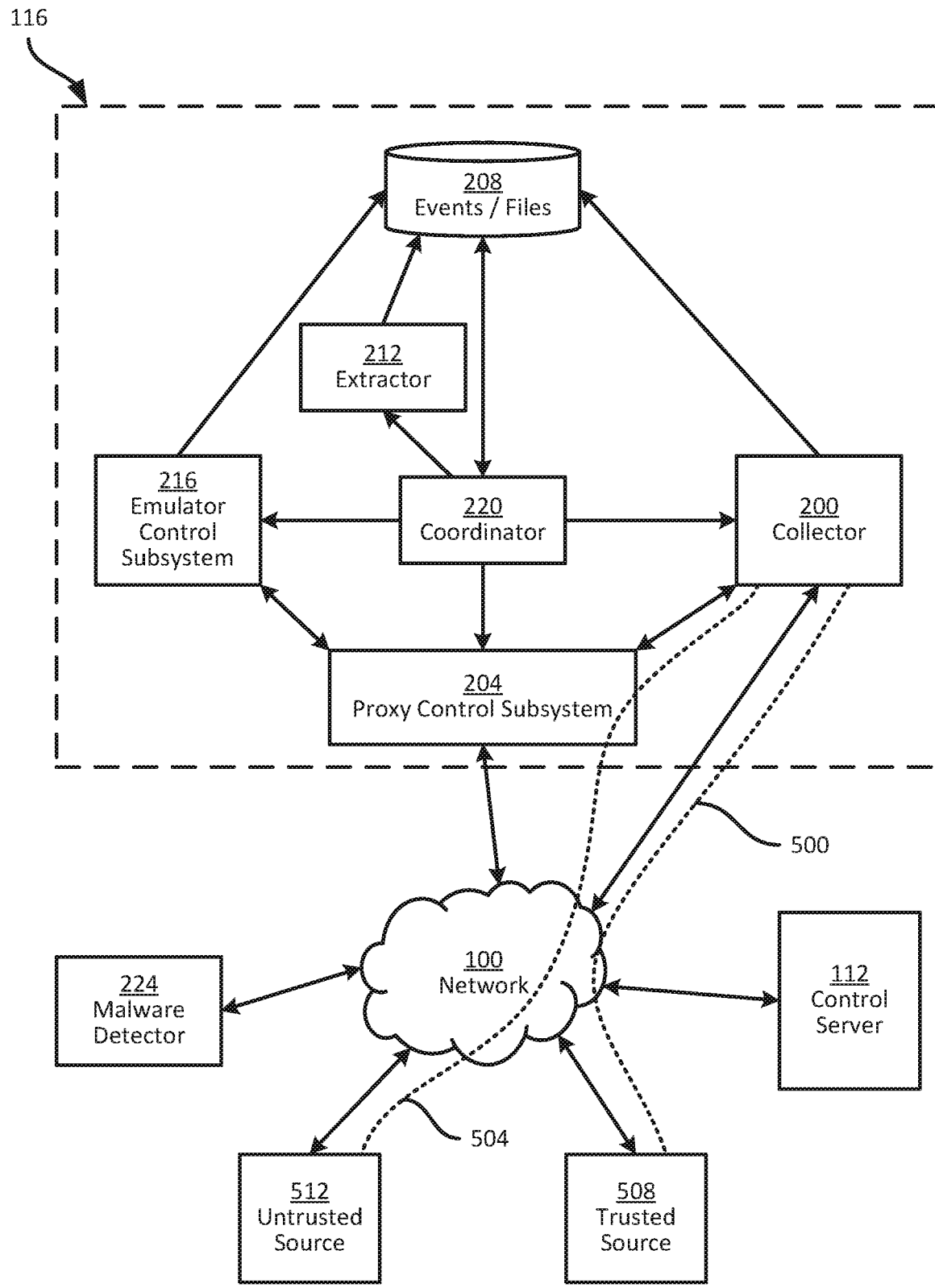
FIG. 5 is a diagram illustrating an example performance of block 405 of the method of FIG. 4.

Turning to FIG. 5, two communication paths 500 and 504 are shown, connecting the collector 200 with a trusted malware source 508 and an untrusted malware source 512, respectively. The collector 200 is configured to select a source to request samples from at block 405, and to determine whether the selected source is trusted or untrusted. When the source is trusted, the collector 200 can send a request (and receive a response containing one or more malware samples) directly via the network 100, as illustrated by the communication path 500. However, when the selected source is untrusted, the collector 200 is configured to send the request via the proxy control subsystem 204 to obscure the origin of the request, as shown by the path 504 in FIG. 5. The proxy control subsystem 204, as will be discussed in greater detail below, can manage a plurality of proxy interfaces that direct requests from the collector 200 (and other components of the system 116) to any of a wide variety of third-party computing devices (i.e. external to the system 116).

Returning to FIG. 4, when the collector 200 has obtained a malware sample (e.g. an executable file, collection of files or the like), the collector 200 stores the sample in the repository 208, e.g. along with an indication of the source of the sample, and the time and date the sample was collected.

At block 410, the system 116 is configured to execute the malware sample obtained at block 405, and to extract operational parameters of the malware sample based on such execution. More specifically, in the illustrated implementation of the system 116, the coordinator 220 (e.g. a sample monitoring agent of the coordinator 220) is configured to monitor the repository 208 for new malware samples. When a new malware sample is detected in the repository 208, the coordinator 220 sends a command to the extractor 212 to retrieve the malware sample from the repository 208 (or the command itself can include the malware sample), and execute the malware sample.

Figure 6:
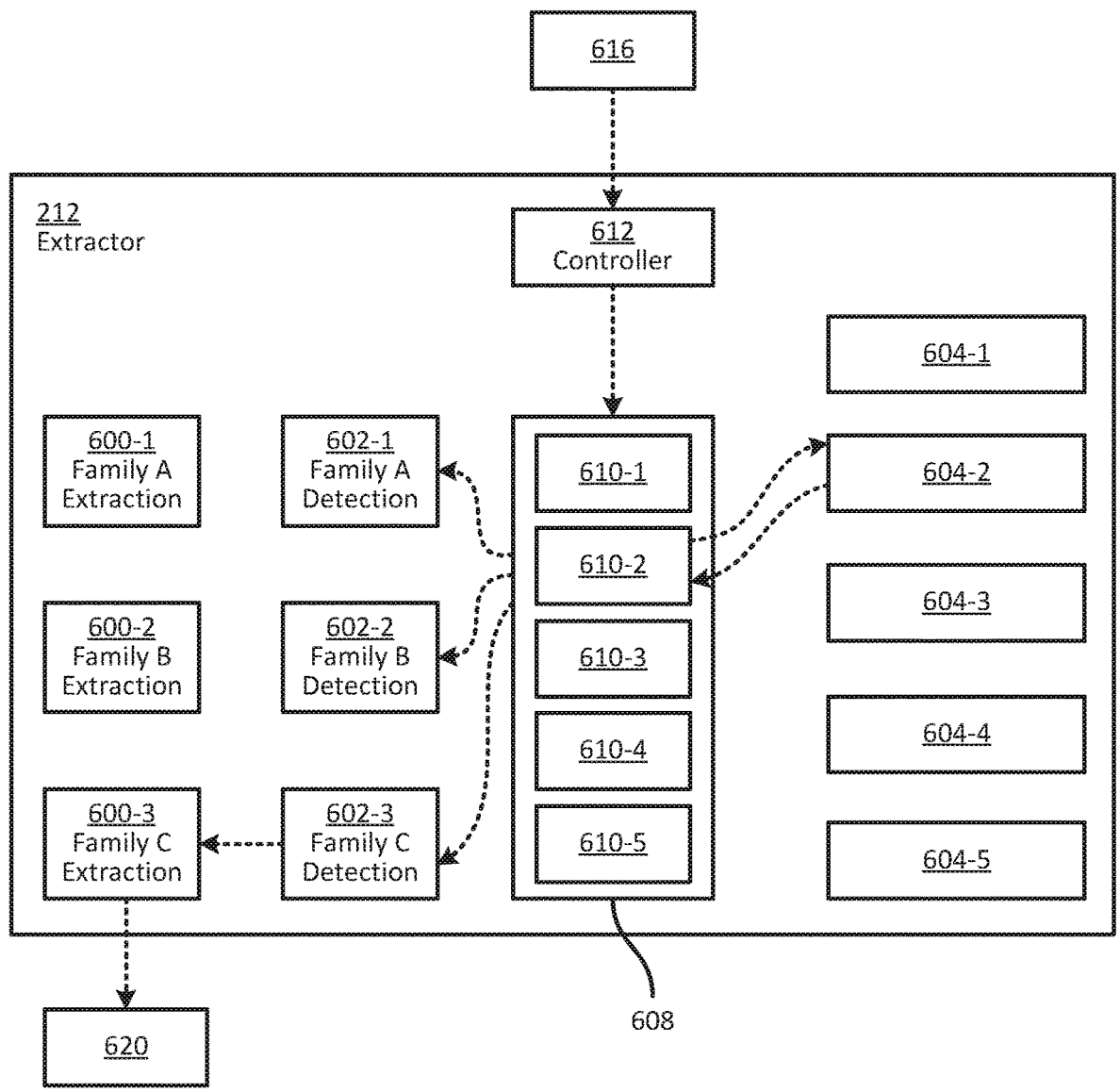
FIG. 6 is a diagram illustrating an example performance of block 410 of the method of FIG. 4.

Referring to FIG. 6, the extractor 212 is shown in greater detail. In particular, the extractor 212 includes a plurality of detection/classification and extraction modules, which may themselves be subdivided into distinct detection/classification modules and extraction modules. In the present example, three extraction modules 600-1, 600-2, and 600-3 and three detection modules 602-1, 602-2 and 602-3, are shown in the extractor 212. Each detection module 602 corresponds to a given family of malware (that is, a given type of malware that has been previously detected and characterized, e.g. by the above-mentioned security research entity, operators of the system 116, or the like). Each detection module 602, in other words, contains rules or other mechanisms that are applied to output data generated via execution of a malware sample to determine whether the malware sample is of the corresponding family/type. The extractor 212 as shown in FIG. 6, therefore, is enabled to determine whether a malware sample is a member of any of three families (referred to simply as A, B, and C). The extractor 212 can be configured to detect other families of malware by deploying additional detection modules 602.

In addition, the extraction modules 600 contain rules and other mechanisms for extracting operational parameters of a malware sample from the output generated via execution of the sample. Examples of operational parameters include control server addresses, polling intervals (i.e. the frequency with which the malware is configured to contact the control server), encryption mechanisms and encryption keys, communication protocols employed by the malware to communicate with control servers, and the like. As noted above in connection with the detection modules 602, additional extraction modules 600 can be deployed to enable the extractor 212 to extract configuration parameters from additional families of malware.

To execute a malware sample, classify the malware sample (i.e. detect which malware family the sample is a member of) and extract operational parameters therefrom, the extractor 212 provides the malware sample to any of a plurality of extraction subsystems 604, which may be implemented in sandbox environments (e.g. virtual machines). Five example extraction subsystems 604-1, 604-2, 604-3, 604-4, and 604-5 are shown in FIG. 6, but it will be apparent that smaller or greater numbers of extraction subsystems may be deployed in other examples. The extraction subsystems 604 may implement different types of sandbox environments; in the present example, the extraction subsystems 604-1, 604-3 and 604-4 may implement a first type of environment (e.g. a first virtual machine architecture), while the extraction subsystems 604-2 and 604-5 may implement a second type of environment. A malware sample may be provided to more than one type of extraction subsystems 604 because malware may include functionality to determine whether certain sandbox environments are present, and disable malware functionality to avoid detection or conceal capabilities of the malware.

In each extraction subsystem 604, the malware sample is executed and output from such execution is provided to one of the detection modules 602 for processing. The other components of the extractor 212 exchange data with the extraction subsystems 604 via an interface 608, such as a set of sandbox drivers 610, allowing commands generated by the other components of the extractor 212 to be agnostic to specific sandbox environments. In the present example, the interface 608 therefore includes sandbox drivers 610-1, 610-2, 610-3, 610-4, and 610-5, corresponding to respective ones of the extraction subsystems 604. The interface 608 also enables data returned from the extraction subsystems 604 to be processed by any of the modules 600 and 602 regardless of sandbox type. That is, the modules 602-1 and 600-1 can process output from the extraction subsystems 604-1 and 604-2 without regard to differences in output formatting or the like between the extraction subsystems 604. As a result, the extractor 212 may avoid deploying multiple modules 600 and 602 for a given malware family, specific to different types of sandbox.

The extractor 212 also includes a controller 612 configured to receive malware samples for processing and allocate the samples among the extraction subsystems 604. The controller 611 may also route the output data generated by the extraction subsystems 604 to the modules 602 and 600. An example flow of data is illustrated in FIG. 6, showing the processing of a sample 616 of malware received at the extractor 212. The controller 612 is configured to select an extraction subsystem 604 to execute the sample, e.g. by selecting an available extraction subsystem 604 (that is not currently occupied with the execution of another sample). The controller 612 can be configured to select an extraction subsystem 604 of a particular type, or to select more than one extraction subsystem 604.

When the controller 612 has selected an extraction subsystem 604, the sample 616 is provided to the selected subsystem 604 via the interface 608. In the illustrated example, the sample 616 is provided to the subsystem 604-2 via the interface 608 (and specifically via the sandbox driver 610-2 that corresponds to the subsystem 604-2). The subsystem 604-2 execute the sample 616, and returns output data via the interface 608. The output data is passed, e.g. via coordination by the controller 612, to each of the detection modules 602. That is, the family of the sample 616 need not be known in advance, as the output generated via execution of the sample 616 is evaluated against each malware family that the extractor 212 is enabled to detect.

The output of malware sample execution provided to the modules 602 and 600 from the extraction subsystems 604 can include memory dumps, application programming interface (API) calls, files generated for storage via execution of the malware, network traffic generated by the malware sample, and the like. As a result, the modules 602 and 600 can detect malware, and extract parameters therefrom, that takes steps to obfuscate such detection by implementing rootkits or the like (e.g. that may be detectable only from a complete memory dump).

The detection modules 602 are each configured to generate output indicating whether the output data satisfies their respective detection criteria, indicating that the sample 616 is a member of the corresponding malware family. The controller 612 can therefore receive indications from each detection module 602 of whether detection was affirmative or negative. When the indication is affirmative, indicating that the malware sample is a member of the family corresponding to the detection module 602, the controller 612 passes the output data to the corresponding extraction module 600. In the illustrated example, it is assumed that the detections at the modules 602-1 and 602-3 are negative, while detection at the module 602-3 is positive. The controller 612 therefore passes the output data from the extraction subsystem 604-2 to the extraction module 600-3, without invoking the extraction modules 600-1 and 600-2. In other examples, a sample may lead to positive detections at more than one detection module 602, and therefore be provided to more than one extraction module 600. In other words, the extractor 212 can detect membership of a sample in multiple malware families from a single execution of the sample in an extraction subsystem 604.

The relevant module 600 (the module 600-3, in the illustrated example) processes the output data to extract operational parameters of the malware sample. In the example illustrated in FIG. 6, the module 600-3 receive the output data after the detection module 602-3 registers a positive detection. The extraction module 600-3 then also extracts operational parameters 620 of the malware sample, for storage in the repository 208.

In some examples, if detection by each of the modules 602 is negative, the controller 612 may select another type of sandbox environment in which to execute the malware sample 616.

Returning to FIG. 4, at block 415 the system 116 can be configured to obtain emulator data, such as executable code and other information, for use in emulating the malware sample obtained at block 405 and extracted at block 410. The data obtained at block 415 may be retrieved from the repository 208 if the malware sample from block 405 is of a previously characterized family. In some examples, the data obtained at block 415 may result from offline reverse engineering of the malware sample by operators of the system 116. In general, the data obtained at block 415 enables the execution of an emulator application that mimics at least some functionality of the malware sample from block 405, including the transmission of requests to a control server (e.g. the control server 112).

Block 415 may be performed, for example, by the emulator control subsystem 216 introduced in FIG. 2. Specifically, the coordinator 220 can detect the addition of new extracted information in the repository 208 (resulting from the performance of block 410) and send an instruction to the emulator control subsystem 216 to retrieve the extracted information and begin emulation of the corresponding malware sample. The emulator control subsystem 216 can also, at block 415, configure the emulator according to the operational parameters extracted from the sample at block 410. That is, the repository 208 may contain a generic emulator for a given malware type, and the operational parameters extracted at block 410 can be employed at block 415 to generate specific instances that mimic the operation of the malware sample obtained at block 405.

At block 420, the emulator control subsystem 216, having configured an emulator with the operational parameters extracted at block 410, selects client attributes for a plurality of emulator instances, and spawns emulator instances to begin monitoring the control server(s) corresponding to the sample obtained at block 405. In general, the emulator instances are configured to emulate respective bots in the botnet managed by the corresponding control server. Thus, if the sample obtained at block 405 is a sample of the malware application 108 mentioned earlier, the emulator instances spawned at block 420 each emulate respective client devices 104 infected by the malware application 108.

The client attributes selected at block 420 can therefore include attributes such as geographic region (e.g. which country an emulated client is in), client architecture (e.g. whether an emulated client is a 32-bit or 64-bit computing device), operating system, and the like. Selection of client attributes at block 420 can include retrieving the client attributes from a preconfigured list stored at the emulator control subsystem 216. For example, the emulator control subsystem 216 may store a set of default client attributes to be used for each new malware sample to be emulated. In other examples the emulator control subsystem 216 can store distinct preconfigured sets of client attributes to be used for corresponding types of malware.

Figure 7:
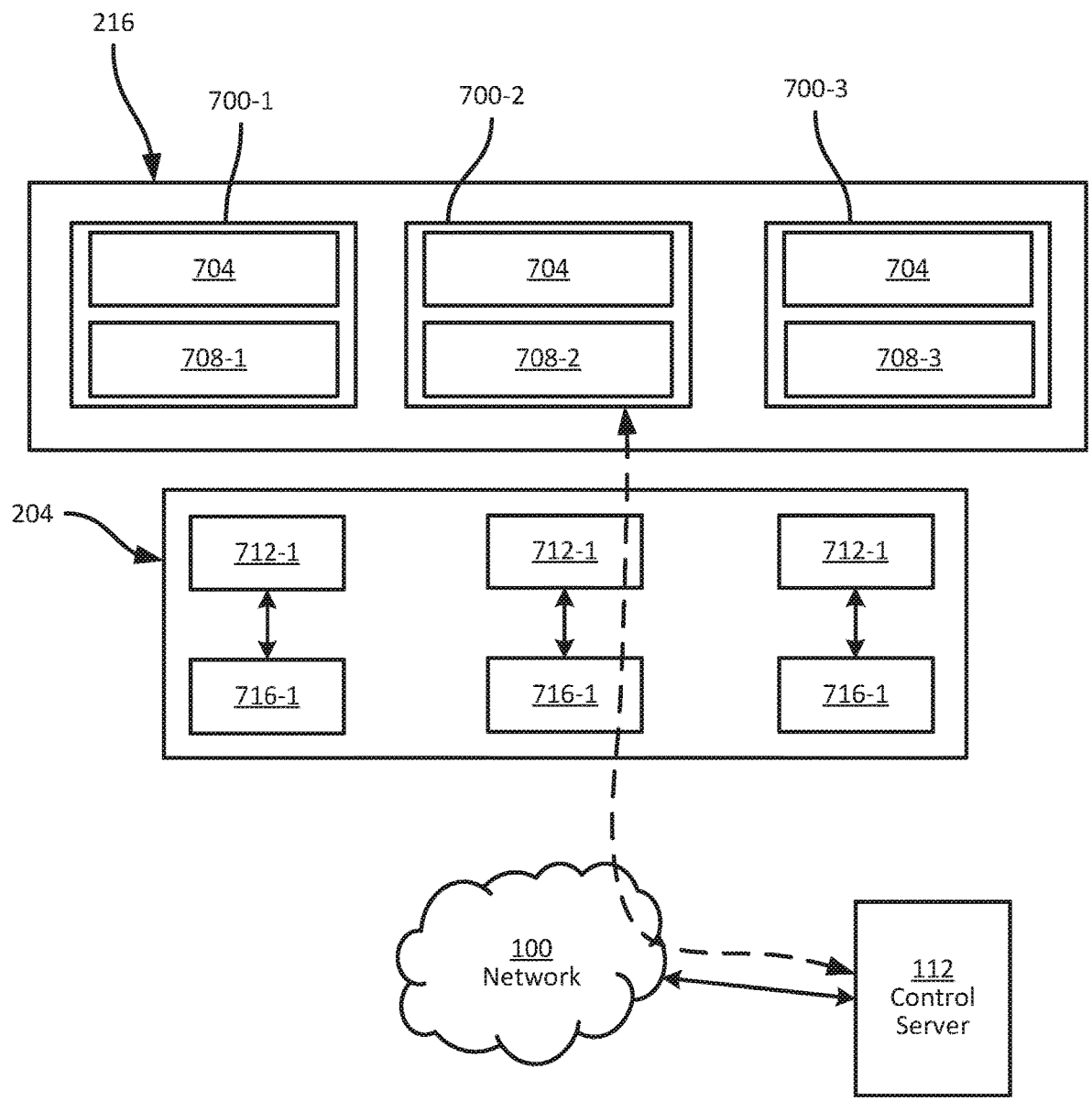
FIG. 7 is a diagram illustrating an example performance of blocks 420 and 425 of the method of FIG. 4.

Having selected client attributes, the emulator control subsystem 216 spawns a set of emulator instances according to the selected client attributes. Turning to FIG. 7, a performance of block 420 by the emulator control subsystem 216 is illustrated. In particular, the emulator control subsystem 216 is shown having spawned three emulator instances 700-1, 700-2, 700-3 of a malware application obtained at block 405. Each instance 700 is defined by an emulator core 704 including the data (e.g. executable code) retrieved at block 415 and the operational parameters extracted at block 410. Each instance 700 is further defined by client attributes 708-1, 708-2 and 708-3 which are specific to the corresponding instance 700. As will now be apparent, the emulator control subsystem 216 can be configured to employ a plurality of computing devices, virtual machines or the like to execute the emulators 700. Because each emulator 700 is non-malicious, instances 700 need not be isolated from one another or from other components of the system 116, and a plurality of emulators can be executed by a single computing device or virtual machine. For example, one computing device can execute a number of emulators 700 having common client architecture and operating system attributes. As a result, the emulator control subsystem 216 may execute a significant number of emulator instances 700 while minimizing the computational demands of such execution.

Each emulator 700 is configured to send requests to the control server 112 via the proxy control subsystem 204 and the network 100, according to the operational parameters extracted at block 410 of the method 400. Certain internal components of the proxy control subsystem 204 are also illustrated in FIG. 7. In particular, the proxy control subsystem 204 includes a plurality of proxy interfaces 712, of which three examples 712-1, 712-2 and 712-3 are shown in FIG. 7. The proxy interfaces 712 are spawned by the proxy control subsystem 204 upon request by the emulator control subsystem 216 (or other components of the system 116, such as the collector 200), and are defined by a communication protocol (e.g. SOCKS, HTTP, or the like). The proxy control subsystem 204 also includes exit interfaces 716-1, 716-2, and 716-3 connecting the proxy interfaces 712 with proxy servers (e.g. VPN servers, Tor nodes or the like) that satisfy the client attributes such as geographic location of the corresponding emulator 700.

The parameters defining a given proxy interface 712 (e.g. IP address, port number and the like) can be provided to the relevant instance 700 for use by that instance 700 to communicate with the control server 112, as shown by the example communications path 720 between the instance 700-2 and the control server 112. The proxy control subsystem 204, in other words, provides a scalable mechanism to obscure the source of the emulator requests (which may be hosted on a smaller number of computing devices, including a single device) from the control server 112.

Referring again to FIG. 4, at block 425 the system 116 (and specifically the emulator control subsystem 216, in the present example) is configured to collect emulator output from the instances spawned at block 420 (e.g. the instances 700 shown in FIG. 7). Emulator output includes the contents of any responses received from the control server 112 to requests sent by the instances 700. Responses from the control server 112, as will be apparent to those skilled in the art, may include any of a variety of data. For example, the control server 112 may transmit commands to the instances 700 to send email messages (i.e. spam), to initiate denial of service (DoS) attacks against a specified target network address, or the like. Other example commands received from the control server 112 include commands to inject URLs or other content into browser activity (e.g. to redirect a client browser to a malicious website associated with the control server 112), to retrieve and send data in a specified location on the client device to the control server, or to download and execute or store a file from the control server 112 or another location.

Each command received at an instance 700 from the control server 112 is stored in the repository 208, along with an indication of the client attributes 708 of the corresponding instance 700. Other metadata, such as the time and date of receipt, may also be stored in the repository 208 along with the contents of the command itself. The emulator output collected and stored at block 425 is subsequently processed for the generation of IOCs.

As will be apparent to those skilled in the art, malware operators may target specific geographic locations, types of client device, or the like. The emulator control subsystem 216, by spawning instances with a wide variety of client attributes, enables the system 116 to detect malware control server activity that may not be readily detectable with a single execution of a malware sample. However, certain emulators 700 may not yield useful monitoring data, as a result of having client attributes that the control server 112 is not configured to target. The emulator control subsystem 216 is therefore also configured to terminate emulator instances under certain conditions.

At block 430, the emulator control subsystem 216 is configured to determine, for each emulator 700 spawned at block 420, whether the emulator is inactive (i.e. has not received a response from the control server 112 in a preconfigured time period). When the determination at block 403 is affirmative, indicating that the emulator 700 is not generating output, the emulator control subsystem 216 returns to block 420 to adjust the active set of emulators 700, e.g. by terminating the inactive emulator 700. Unproductive emulators 700 are therefore pruned periodically, releasing computational resources for use in running other emulators (either corresponding to the same sample, or to different malware samples).

When the determination at block 430 is negative (no remaining emulators 700 have become inactive), the performance of the method 400 proceeds to block 435. At block 435, the coordinator 220 is configured to determine whether an update to the emulators 700 is required. The determination at block 435 is based on the emulator output collected at block 425 and stored in the repository 208. For example, the coordinator 220 (e.g. an update monitoring agent thereof) can be configured to monitor the repository 208 for specific types of emulator output that are indicative of changes in functionality of the malware application corresponding to the emulators 700.

Examples of emulator output indicating that updates may be required for the emulators 700 include a command received from the control server 112 that was not understood by the receiving emulator 700. Such a command may indicate new functionality deployed by the control server 112, or previous functionality not currently accounted for by the emulator core 704. Unknown commands may be reported to the repository 208 by emulators with a predefined tag (e.g. "UnknownCommand" or the like). Another example of emulator output that may result in an affirmative determination at block 435 includes a command to download and execute files at the emulator 700.

When the determination at block 435 is affirmative, the coordinator 220 can generate an instruction to the extractor 212 to repeat block 410, e.g. using the above-mentioned files that an emulator 700 was instructed to download and execute. In other examples, the coordinator 220 can generate a notification for an operator of the system 116, e.g. indicating that a further performance of block 415 is required to update the emulator core 704 to interpret an unknown command.

When the determination at block 435 is negative, at block 440 the coordinator 220 is configured to publish emulator output, and/or data based on the emulator output. As will now be apparent to those skilled in the art, block 440 can also be performed in parallel with blocks 430 and 435. That is, negative determinations at block 430 and 435 are not necessary for the publication of IOCs or other data based on emulator output at block 440.

At block 440, for example, the coordinator 220 can be configured to process the emulator output according to preconfigured rulesets to generate IOCs based on the emulator output. The IOCs can include traffic patterns (e.g. times of day and/or frequency of responses received from the control server 112), files or command strings received from the control server 112, and the like. The above-mentioned rulesets can include mapping rules that normalize emulator output to a common data model. For example, the mapping rules can define a variety of commands having the function of inject content into web sessions, and can also define a normalized identifier, e.g. "WebInject", that corresponds to those commands. Thus, each command in the repository collected by an emulator 700 can be expressed according to a common data model, for example indicating the function of the various commands sent by the control server 112.

The IOCs generated at block 440 can be published by the coordinator 220 in various ways. For example, the coordinator 220 can automatically transmit IOCs to third parties such as the malware detector 224 shown in FIG. 2. In other examples, the coordinator 220 can expose an API over which such third parties can request IOCs for specific types of malware. An example format in which the IOCs can be stored is defined by the MITRE ATT&CK knowledge base.

Performance of the method 400 need not terminate after the performance of block 440. For example, a plurality of emulators for each of a plurality of malware samples can be executed in parallel, and IOCs may be generated and published in parallel with the execution of such emulators. That is, the system 116 can enable continuous monitoring of a plurality of malware samples, as well as dynamic, at least partially automated updating of emulators in response to commands received from malware control servers.

Those skilled in the art will appreciate that in some embodiments, the functionality of the components of the system 116 discussed above may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A malware monitoring method, comprising:
obtaining a malware sample;
extracting operational parameters corresponding to the malware sample;
configuring an emulator application corresponding to the malware sample using the operational parameters;
selecting a plurality of client attribute sets from a preconfigured list of client attributes, each of the selected plurality of client attribute sets including at least a geographic region;
executing a plurality of instances of the configured emulator application, each of the plurality of instances having a respective one of the selected plurality of client attribute sets;
collecting output data from each of the plurality of instances;
generating indicators of compromise (IOCs) based on the collected output data output;
periodically detecting that a first subset of the plurality of instances are not generating output; and
terminating the first subset of the plurality of instances, while continuing execution of a second subset of the plurality of instances.

2. The method of claim 1, wherein obtaining the malware sample includes retrieving the malware sample from at least one preconfigured source.

3. The method of claim 1, wherein extracting the operational parameters includes:
executing the malware sample in a plurality of sandbox environments to generate respective sets of sample output; and
extracting the operational parameters from the sets of sample output at an extraction module external to the plurality of sandbox environments.

4. The method of claim 3, wherein the respective sets of sample output include at least one of memory dumps, files, and network traffic.

5. The method of claim 1, wherein the operational parameters include at least a network address of a control server corresponding to the malware sample.

6. The method of claim 5, wherein periodically detecting that the first subset of the plurality of instances are not generating output includes:

determining whether any of the plurality of instances have not received data from the control server for a predetermined period of time.

7. The method of claim 1, wherein each of the selected plurality of client attribute sets further includes at least one of a client operating system, and a client computing architecture.

8. The method of claim 1, wherein executing the plurality of instances includes routing requests to a control server through a proxy interface corresponding to the geographic region.

9. The method of claim 1, further comprising:
determining whether the output data indicates an update requirement for the plurality of instances; and
when the determination is affirmative, repeating the extraction of operational parameters.

10. A computing device, comprising:
a communications interface;
a memory; and
a processor configured to:
obtain a malware sample;
extract operational parameters corresponding to the malware sample;
configure an emulator application corresponding to the malware sample using the operational parameters;
select a plurality of client attribute sets from a preconfigured list of client attributes, each of the selected plurality of client attribute sets including at least a geographic region;
execute a plurality of instances of the configured emulator application, each instance of the plurality of instances having a respective one of the selected plurality of client attribute sets;
collect output data from each of the plurality of instances;
generate indicators of compromise (IOCs) based on the collected output data;
periodically detect that a first subset of the plurality of instances are not generating output; and
terminate the first subset of the plurality of instances, while continuing execution of a second subset of the plurality of instances.

11. The computing device of claim 10, wherein the processor is configured, in order to obtain the malware sample, to retrieve the malware sample from at least one preconfigured source.

12. The computing device of claim 10, wherein the processor is configured, in order to extract the operational parameters, to:
execute the malware sample in a plurality of sandbox environments to generate respective sets of sample output; and
extract the operational parameters from the sets of sample output at an extraction module external to the plurality of sandbox environments.

13. The computing device of claim 12, wherein the respective sets of sample output include at least one of memory dumps, files, and network traffic.

14. The computing device of claim 10, wherein the operational parameters include at least a network address of a control server corresponding to the malware sample.

15. The computing device of claim 14, wherein the processor is further configured, to periodically detect that the first subset of the plurality of instances are not generating output to:
determine whether any of the plurality of instances have not received data from the control server for a predetermined period of time.

16. The computing device of claim 10, wherein each of the selected plurality of client attribute sets further includes at least one of a client operating system, and a client computing architecture.

17. The computing device of claim 10, wherein the processor is configured, in order to execute the plurality of instances, to route requests to a control server through a proxy interface corresponding to the geographic region.

18. The computing device of claim 10, wherein the processor is further configured to:
determine whether the output data indicates an update requirement for the plurality of instances; and
when the determination is affirmative, repeat the extraction of operational parameters.

* * * * *